(12) United States Patent
Poluri et al.

(10) Patent No.: US 12,704,284 B2
(45) Date of Patent: Aug. 11, 2026

(54) REMOTE MONITORING AND CONTROLLING OF VRF/VRV SYSTEMS VIA PROTOCOL FOR SMALL AND MEDIUM BUILDINGS

(71) Applicant: HONEYWELL INTERNATIONAL INC., Charlotte, NC (US)

(72) Inventors: Nagasree Poluri, Charlotte, NC (US); Gutha Stalin Sanghamitra, Charlotte, NC (US); Suresh Vemuri, Charlotte, NC (US); Utkarsh Mishra, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 532 days.

(21) Appl. No.: 18/327,462

(22) Filed: Jun. 1, 2023

(65) Prior Publication Data

US 2023/0392814 A1 Dec. 7, 2023

(30) Foreign Application Priority Data

Jun. 6, 2022 (IN) ............................ 202211032227

(51) Int. Cl.
*F24F 11/63* (2018.01)
*H04L 67/12* (2022.01)

(52) U.S. Cl.
CPC .............. *F24F 11/63* (2018.01); *H04L 67/12* (2013.01)

(58) Field of Classification Search
CPC ............ F24F 11/63; F24F 11/58; H04L 67/12
See application file for complete search history.

(56) References Cited

U.S. PATENT DOCUMENTS 10,868,857 B2 12/2020 Park et al.
11,499,738 B2 11/2022 Ratakonda et al.
2005/0260996 A1* 11/2005 Groenendaal ..... H04M 1/72457 455/445
2014/0098247 A1* 4/2014 Rao ....................... H04L 67/125 455/420
2015/0127165 A1* 5/2015 Quam ................... H04L 67/125 700/275
2015/0278245 A1* 10/2015 Sagar .................. G06F 16/9574 707/610
2017/0289731 A1* 10/2017 Kamineni ................ G06F 8/38
(Continued)

OTHER PUBLICATIONS

Lennox Industries Inc., User Guide, Jun. 2022, p. 1-13 (Year: 2022).*

(Continued)

*Primary Examiner* — Kidest Worku
(74) *Attorney, Agent, or Firm* — Seager, Tufte & Wickhem, LLP

(57) ABSTRACT

A system having an enabling remote monitoring, control and diagnosis of variable refrigerant flow or volume systems, with other systems of a building/overall BMS with a mobile application (app) so that buildings can have seamless interoperability. In the present disclosure or solution, VRF systems along with mechanical equipment, controllers, sensors, actuators may be offered by OEMs. A mobile app may be used to configure the gateway, Modbus or other protocol devices and all or any IDUs and ODUs of the VRF/VRV systems, to enable extended remote monitoring, control and diagnosis.

19 Claims, 7 Drawing Sheets

(56) References Cited

U.S. PATENT DOCUMENTS

| | | | | |
|---|---|---|---|---|
| 2019/0107296 | A1* | 4/2019 | Clark | F24F 11/30 |
| 2019/0271978 | A1* | 9/2019 | ElBsat | G06Q 30/0282 |
| 2020/0011562 | A1* | 1/2020 | Turney | G05B 13/021 |
| 2020/0044888 | A1* | 2/2020 | Manricks | H04L 12/282 |
| 2021/0158975 | A1* | 5/2021 | Turney | G16Y 40/20 |
| 2021/0231340 | A1 | 7/2021 | Nystrom et al. | |
| 2021/0342961 | A1 | 11/2021 | Winter et al. | |
| 2021/0397763 | A1 | 12/2021 | Gupta et al. | |

OTHER PUBLICATIONS

Astrum Technology, VFace Control VRV/VRF so Easy, 9 pages, 2021. Accessed Dec. 23, 2021.

CoolMasterNet by CoolAutomation, 11 pages, 2021. Accessed Dec. 23, 2021.

* cited by examiner

REMOTE MONITORING AND CONTROLLING OF VRF/VRV SYSTEMS VIA PROTOCOL FOR SMALL AND MEDIUM BUILDINGS

CROSS-REFERENCE TO RELATED APPLICATIONS

This application claims priority pursuant to 35 U.S.C. 119(a) to Indian Application No. 202211032227, filed Jun. 6, 2022, which application is incorporated herein by reference in its entirety.

BACKGROUND

Building management systems (BMS), especially for small and medium sized buildings (i.e., like restaurants, supermarkets, and so on) may be moving towards ductless, easy to install heating, ventilation and air conditioning (HVAC) systems like variable refrigeration flow (VRF) and variable refrigeration volume (VRV) systems. A VRV system may provide a variable refrigerant volume control for heating and cooling spaces in a facility. A VRF may involve a variable refrigerant flow system where a compressor may heat or cool the refrigerant, which is then sent into the building to condition the air. A variable speed drive may control a compressor, allowing it to regulate and vary the flow of refrigerant through multiple evaporator coils.

The original equipment manufacturers (OEMs) of VRF and VRV systems may include Daikin™, Bluestar™, Mitsubishi™, Hitachi™, and so forth, that usually offer control systems along with mechanical equipment. These control systems may include controllers, input, output devices like sensors, and so on, and tools to configure the same. These control systems may work effectively when used at a site. But, a problem can arise when these systems have to be controlled or monitored remotely as there may not be an out of the box solution provided by OEMs for remote monitoring and controlling. Also, it may be a challenge to integrate, for instance, a VRF or VRV system with an overall building management system (HVAC, lighting, fire, and so forth) in a building due to its proprietary control systems. VRV or VRF systems may be treated as interchangeable for the present description.

Looking at, for instance, the VRF system, it may be needed to be turned on or off based on a fire input signal from a fire system. Although the OEMs expose the control system parameters using some open protocols like Modbus™, seamless interoperability of VRF systems may still be a challenge as one may understand each control parameter and build solution, and tools through which different systems (e.g., HVAC, fire, security) integrate seamlessly.

The current state of art does not seem to provide any end-to-end solutions through which VRF and VRV systems can be remotely controlled and monitored/diagnosed by maintaining a seamless integration with the BMS.

SUMMARY

The present disclosure pertains to an enabling remote monitoring, control and diagnosis of variable refrigerant flow or volume systems, with other systems of a building/overall BMS with a mobile application (app) so that buildings can have seamless interoperability. In the present disclosure or solution, VRF systems along with mechanical equipment, controllers, sensors, actuators may be offered by OEMs. A mobile app may be used to configure the gateway, Modbus or other protocol devices and all or any IDUs and ODUs of the VRF/VRV systems, to enable extended remote monitoring, control and diagnosis.

DESCRIPTION

Figure 1:
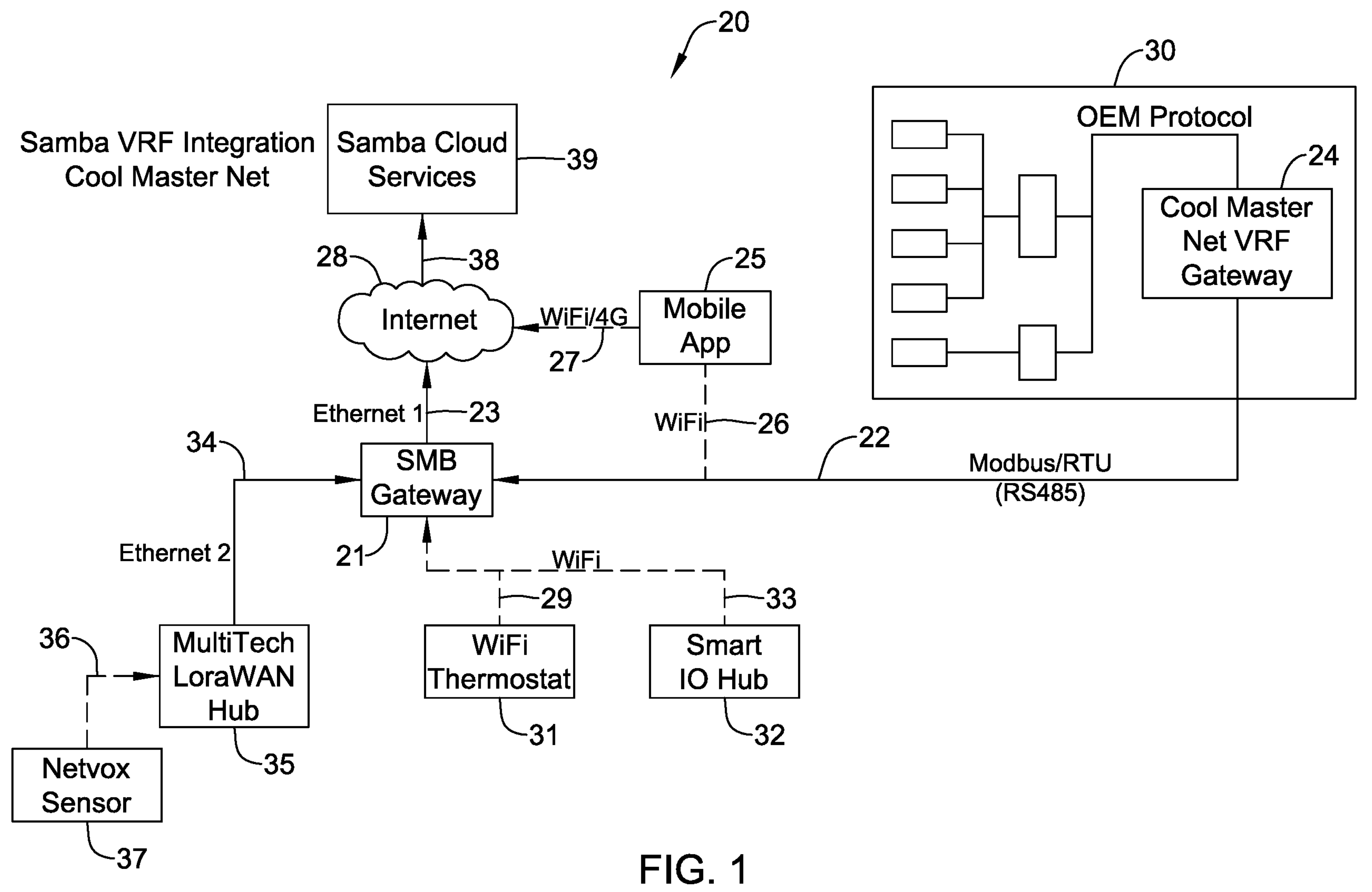
FIG. 1 is a diagram of a SAMBA integration, which may be referred to as a cool master net.

The present disclosure or system may be about an intuitive way of enabling remote monitoring, control and diagnosis of VRF systems so that truck rolls to the site can be avoided. Integrating VRF systems with other systems of a building/overall BMS with a mobile application (app) so that buildings can have seamless interoperability, may reduce maintenance and operational costs. It may save time and costs for customers as a solution should enable remote monitoring and control thus saving truck rolls to site. Seamless integration of the VRF with the BMS may enable customer adaption. The present approach may be a key differentiator and USP for a SaMBa market across the globe and be a new business opportunity for a company.

In the present disclosure or solution, VRF systems along with mechanical equipment, controllers, sensors, actuators may be offered by OEMs. A VRF system may contain one outdoor unit (ODU) and several indoor units (IDUs).

The OEMs may also expose the control parameters of IDUs and ODUs using a Modbus™ protocol. The term “protocol” may refer to Modbus herein unless indicated otherwise. Other protocols may be noted and implemented. For an illustrative example, a Modbus card or device may be connected to multiple IDUs and ODUs. The number of ODUs connected to a VRF and number of IDUs connected to the VRF may be configurable through the tools provided by OEMs.

In a solution, a gateway (e.g., a Honeywell Beats™ gateway) may be integrated with the Modbus devices. The gateway may have an ethernet port that can be used to connect to the Internet (i.e., wired). Also, the gateway may have two or more RS485 ports out of which a first RS485 channel is reserved for Modbus.

A mobile app (e.g., a Honeywell Connect Mobile™, a deploy app) may be used to configure the gateway, Modbus devices and all or any IDUs and of the VRF system, to enable remote monitoring. The gateway may come with a default Wi-Fi access point and the mobile app may connect to a Wi-Fi access point of the gateway. The term “app” may refer to “mobile app” herein unless indicated otherwise Configuration in the mobile app may be noted. With a mobile app, a user may add a gateway and configure its first RS-485 channel as a Modbus. The mobile app may provide default properties of the Modbus channel and allow a user to customize the properties, e.g., stop bits, transmission mode, and so forth.

The mobile app may be connected to the gateway's Wi-Fi™ access point and map the physical gateway with a logical gateway by getting a serial number from the gateway and associating it in the mobile app. The resulting configuration may then be downloaded/pushed from the mobile app to the gateway so that the gateway is aware of the Modbus channel details under it. The Modbus device may have details like the device address, name, and model that can be set in the mobile app.

The mobile app may provide a way to add a Modbus device under a selected gateway. If the user adds the Modbus device first, without configuring the Modbus channel in the gateway, the mobile app may automatically configure a gateway's RS 485 channel one (1) as a Modbus channel and let the user configure its properties, such as stop bits, a transmission mode, and so on.

A description of a solution may be indicated. Modbus device details like a device address, name, and model may be set in the mobile app. The mobile app may provide a step-by-step workflow guide to add an IDU and ODU as an equipment's insides of each Modbus device.

The mobile app may have a workflow to prompt a user to enter a base address for each type of Modbus point. Example points may include a discrete input, input register, holding register, and a coil for a given IDU or ODU. Given these details, the mobile app may automatically calculate the actual address of these points as it knows the offset for each point through templates.

The mobile app may establish an automatic Modbus binding or point sharing from each control parameter of each IDU and ODU to a gateway. The mobile app may also establish a cloud binding for each point so that when a point is commanded/read from cloud/remote, it can identify which Modbus parameter to command/read. Also, the mobile app may provide a way to establish point sharing between systems. For example, if a fire input has to be used to control the VRF system to on/off, a user may establish point sharing between a fire input point (from another controller in the same site) to an IDU system enable point (from a Modbus controller).

The mobile app may synchronize the model data to a cloud against that site. A supervisor application may fetch this information from the cloud to enable remote monitoring and control. The supervisor may be a web application that can be used by building operators on a day-to-day basis.

The gateway may keep polling the values from the Modbus devices and sending them as telemetry data to the cloud. The supervisor may use this telemetry data and display the VRF monitoring points live values. Also, the supervisor may provide a way to command a point which in turn goes via the cloud and the gateway to a Modbus device.

Features of the present system may be noted. The system may be an approach for enabling remote monitoring, controlling and diagnosis of a VRF and/or VRV via a Modbus interface using a mobile app. It is an approach of integrating VRF or VRV systems with other systems of a building and/or an overall BMS system for seamless interoperability.

The mobile app may provide a step-by-step guided workflow to add the IDU and ODU systems as the equipment's inside of each Modbus device. Based on the type of Modbus device or vendor, for example, Bluestar, the mobile app may have a template corresponding to that model from which one can retrieve the control and monitor parameters as Modbus points in each indoor and outdoor unit of a VRF, for example, temp setpoint, fan, swing mode, and so on.

Each template may be designed based on a Modbus specification by a vendor. A template may contain each parameter name, address offset, type of Modbus register, and so on. The mobile app may have a workflow to prompt the user to enter a base address for each type of Modbus point, for examples, one may note discrete input, input register, holding register, coil for a given IDU or ODU, and so forth. Given these details, the mobile app may automatically calculate an actual address of these points as it knows the offset for each point through templates. The mobile app may establish automatic Modbus binding/point sharing from each control parameter of each IDU and ODU to the gateway.

FIG. 1 is a diagram 20 of a SAMBA integration, which may be referred to as a cool master net. An SMB gateway 21 may have numerous inputs and an outlet 23 to an Ethernet 1. Input 22 may be from a Modbus US/RTU (RS485) 30 to gateway 21. Input 22 may be from a cool master net VRF gateway 24 with an OEM protocol. Input 22 may go to a mobile app 25 via a Wi-Fi connection 26. A Wi-Fi/4G output 27 from module app 25 may go to an internet 28.

An output 29 from a Wi-Fi thermostat 31 and a Wi-Fi output 33 from a smart IO hub 32 may go to gateway 21. An Ethernet 2 input 34 to gateway 21 may come from a multi tech Lora WAN hub 35. A signal 36 may go from a Netvox sensor 37 to Lora WAN hub 35. An output 38 may go from Internet 28 to a Samba cloud services station 39.

Figure 2:
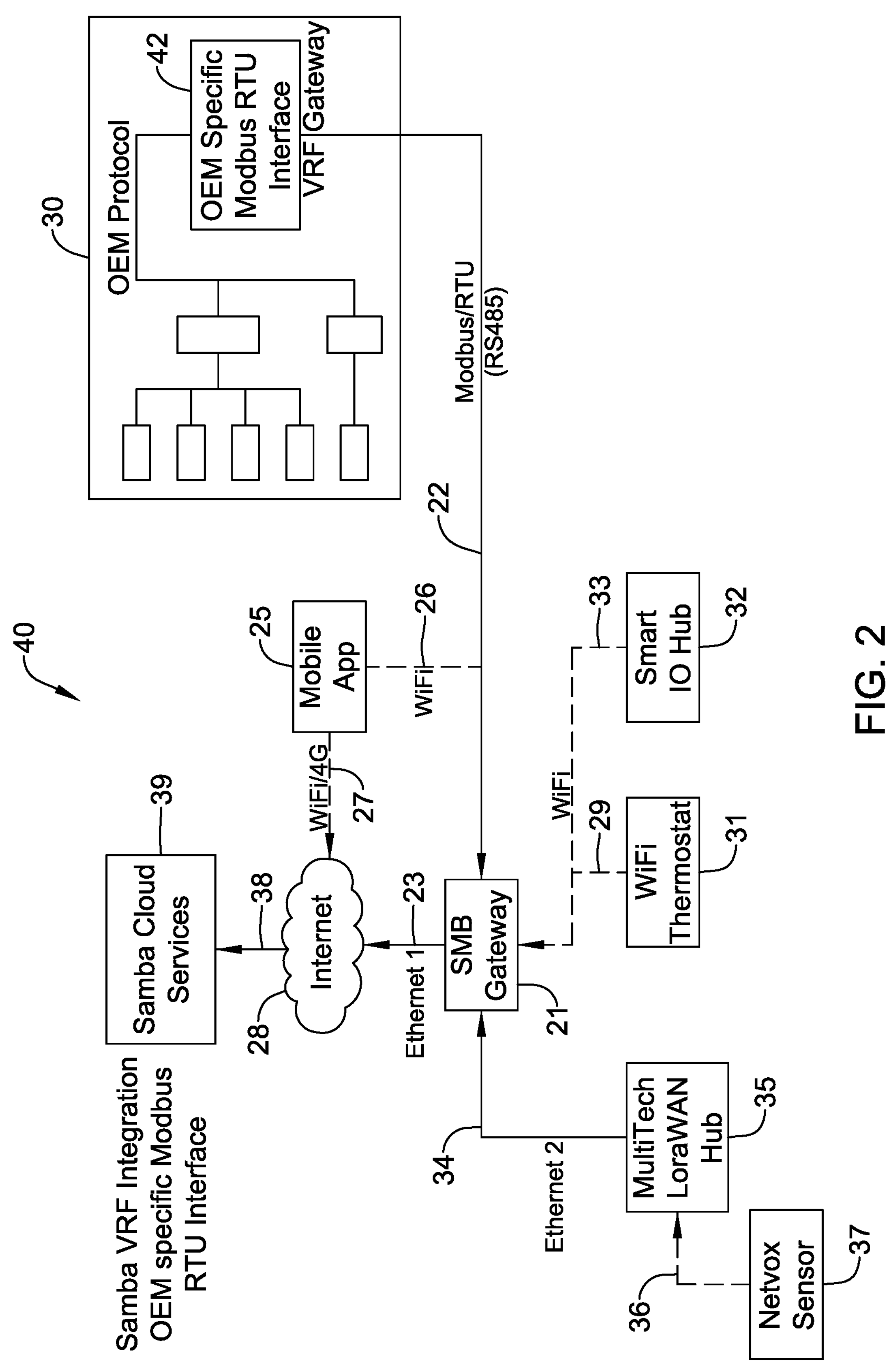
FIG. 2 is a diagram that reveals an OEM specific Modbus RTU interface.

FIG. 2 is a diagram 40 that appears similar to diagram 20 of FIG. 1. Diagram 40 reveals an OEM specific Modbus RTU interface 42 of the Modbus/RTU (RS485) 30 with an input 22 to gateway 21.

Figure 3:
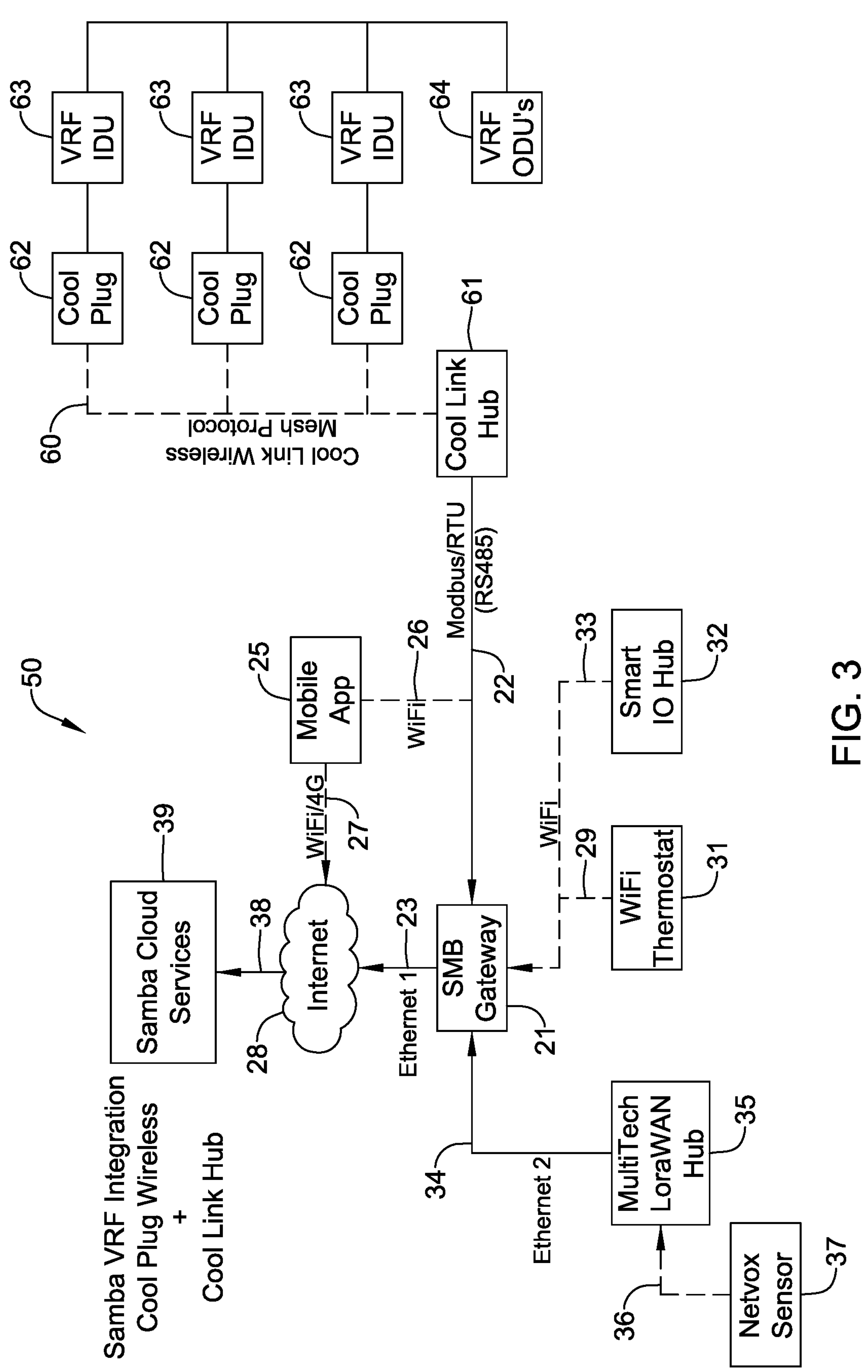
FIG. 3 is a diagram reveals a cool plug hub at an enclosure that puts out a signal to an SMB gateway.
Figure 4:
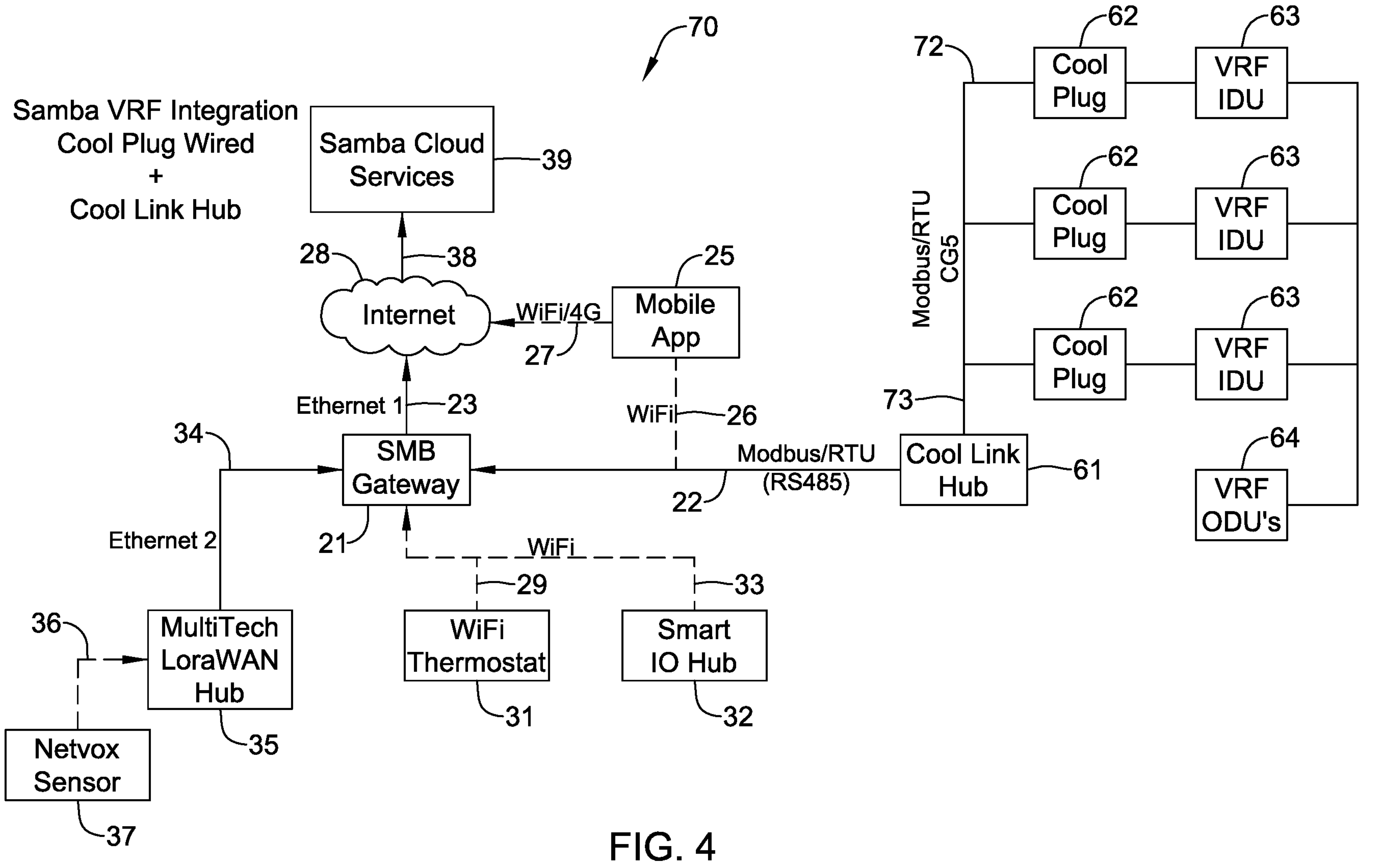
FIG. 4 is a diagram that reveals a cool plug wired plug plus a cool link hob, which may be optional in this layout.

FIG. 3 is a diagram 50 that appears similar to diagram 20 of FIG. 1. Diagram 50 reveals a cool link hub 61 at enclosure 60 that puts out a signal 22 to SMB gateway 21. Enclosure 60 has a cool link wireless mesh protocol. There may be three cool plugs 62 and three VRF IDUs 63 and one VRF ODU 64. FIG. 4 is a diagram 70 that appears similar to diagram 50 of FIG. 3. Diagram 70 reveals a cool plug wired plus a cool link hub 61, which is optional in this layout. Diagram 72 has the cool plugs 62, VRF IDUs 63, and VRF ODUs 64, and outputs a Modbus/RTU CG5 (RS485) signal to the cool link hub 61, or directly without hub 61, to SMB gateway 21 on line 22.

Figure 5:
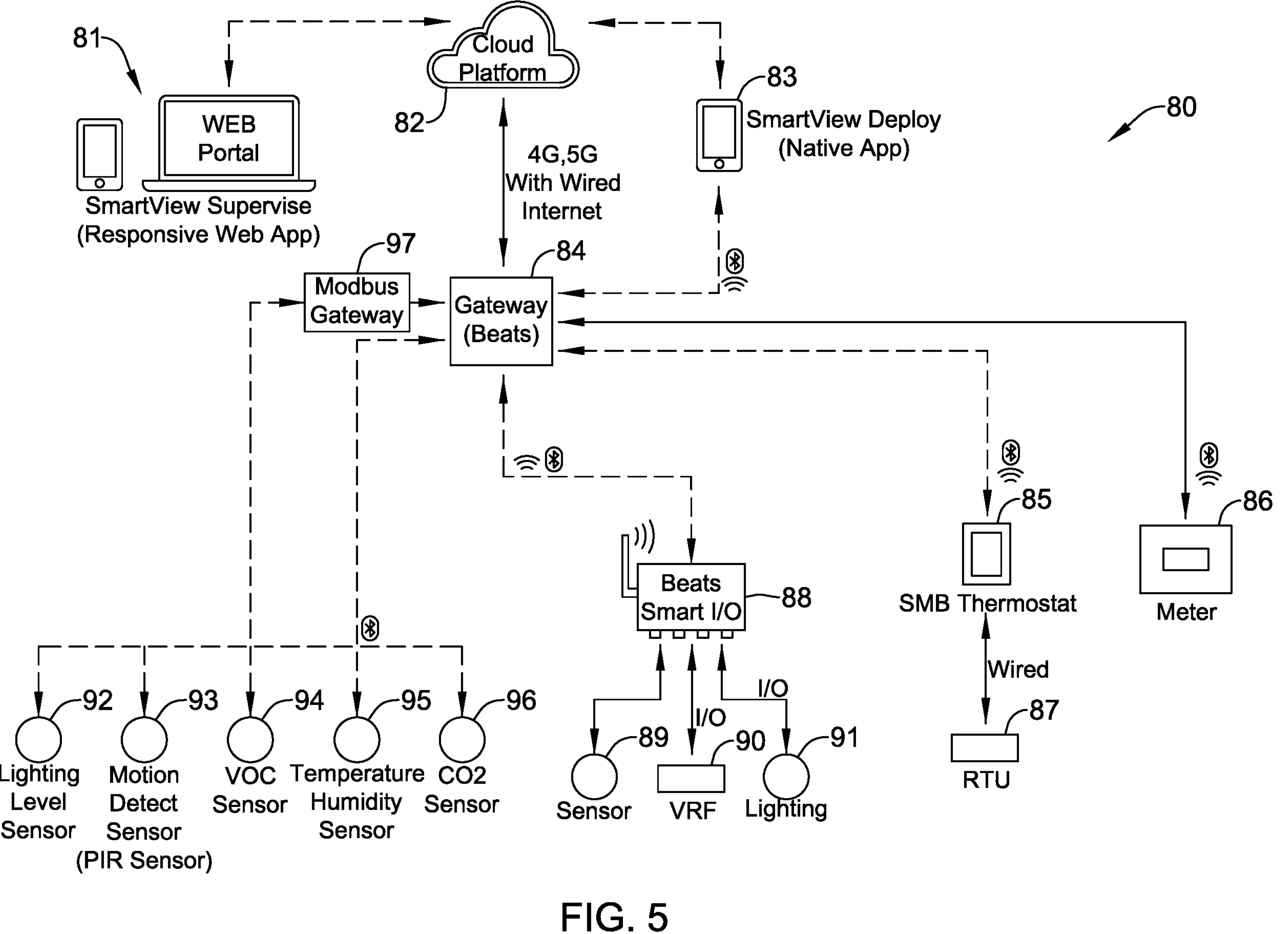
FIG. 5 is a diagram of an SMB architecture with a smart view supervisor with a web portal, which may be connected some kind of platform in a cloud.

FIG. 5 is a diagram of an SMB architecture 80. There may be a smart view supervisor (a responsive web app) 81 with a web portal, which may be connected to a cloud platform or some other kind of platform in a cloud 82. Cloud 82 may be connected to a smart view deploy (native app) 83. Supervisor 81, cloud 82 and deploy app 83 may be connected to a (Beats) gateway 84. An SMB thermostat 85 and a meter (Emon™) 86 may be connected to gateway 84. Thermostat 85 may be connected to an RTU 87.

A (Beats) smart IO 88 may be connected to gateway 84. A sensor or sensors 89, VRF 90 and lighting 91 may be connected to smart IO 88. A lighting level sensor 92, a motion detect sensor (PIR sensor) 93, a VOC sensor 94, a temperature/humidity sensor 95 and a CO2 sensor 96 may be connected to gateway 84. The connections of the sensors may be via a Modbus gateway 97. Connections among the components of architecture may variations of wireless and wire designs. The gateway may of various protocols, such as Modbus and so forth.

Figure 6:
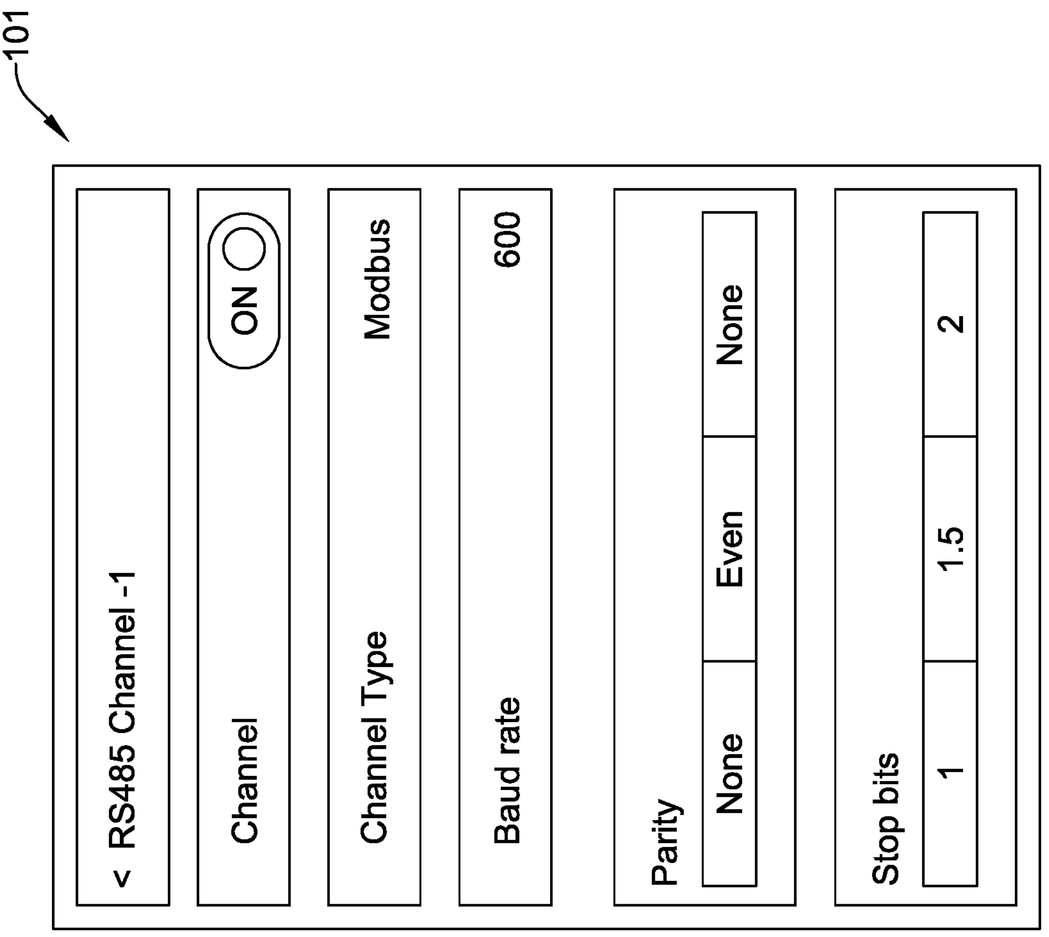
FIG. 6 and FIG. 7 indicate a Modbus device configuration with IDU and ODU equipment in view of their diagrams.
Figure 7:
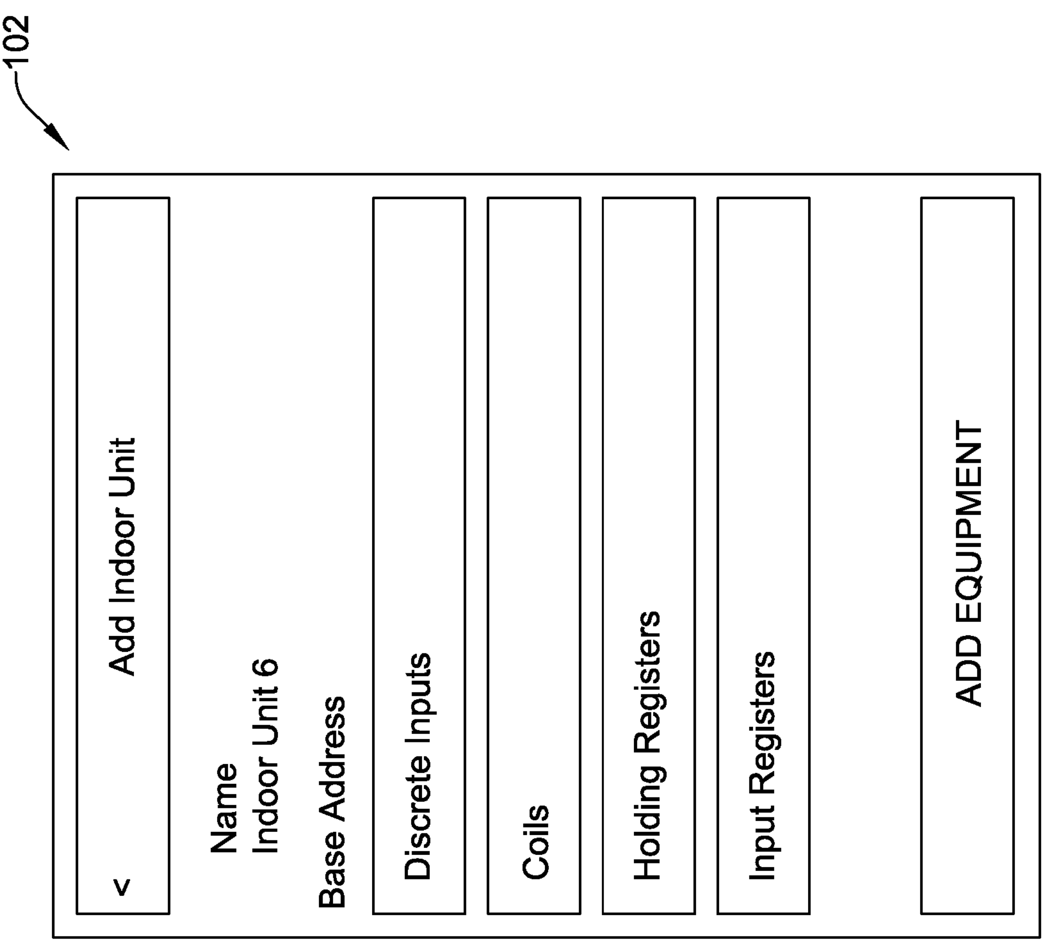

FIG. 6 and FIG. 7 indicate a Modbus device configuration with IDU and ODU equipment in view of diagrams 101 and 102, respectively. Diagram 101 reveals Modbus properties for RS485 Channel-1. Example Properties listed may include Channel-On, Off, Channel Type-Modbus, Baud Rate-600, Parity-None, Even, Odd, and Stop Bits-1, 1.5, 2. Diagram 102 reveals information for adding equipment with a base address for various Modbus point types. An example is to add an indoor unit. Example information is name—Indoor Unit 6, Base address, Discrete inputs, Coils, Holding registers, and Input registers.

U.S. patent application Ser. No. 16/908,437, filed Jun. 22, 2020, is hereby incorporated by reference. U.S. patent application Ser. No. 17/304,268, filed Jun. 17, 2021, is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for remote control of variable refrigerant flow (VRF) systems for small and medium buildings, comprising:

a VRF system having one or more indoor units (IDUs) and one or more outdoor units (ODUs);

a protocol device that exposes control parameters of the IDUs and the ODUs;

a gateway having an Ethernet port connectable to an Internet; and a mobile app connected to the gateway; and wherein the gateway has two or more ports, one of which is reserved for the protocol device;

wherein the mobile app has a template corresponding to a model of the protocol device; and wherein the template enables retrieval of monitor and control parameters as protocol device points in each IDU and ODU of the VRF.

2. The system of claim 1, wherein the mobile app is used to configure the gateway, protocol device and any or all IDUs or ODUs of the VRF system to enable remote control.

3. The system of claim 2, wherein:

the gateway has a default Wi-Fi access point; and the mobile app is connectable to the Wi-Fi access point of the gateway.

4. The system of claim 1, wherein:

the mobile app provides default properties of the protocol device which is customizable;

the mobile app is connected to an access point of the gateway;

the mobile app gets a serial number from the gateway and associates the serial number with the mobile app; and a configuration is downloaded from the mobile app to the gateway so that the gateway is aware of the details of the protocol device.

5. The system of claim 4, wherein:

the details of the protocol are set in the mobile app; and the mobile app provides a step-by-step guided work flow to add an IDU and ODU inside each protocol device.

6. The system of claim 1, wherein the mobile app automatically calculates an actual address of the points as the mobile app knows the offset for each point through the template.

7. The system of claim 2, wherein the mobile app establishes:

an automatic protocol binding/point sharing from each control parameter of each IDU and ODU to the gateway;

a cloud binding for each point so that when a point is commanded/read from cloud/remote, the gateway can identify which protocol parameter to command/read; and the mobile app provides a way to establish point sharing between systems.

8. The system of claim 7, wherein:

the mobile app can synchronize the model data to a cloud against the site; and the information is fetched by a supervisor application from the cloud to enable remote monitoring and control.

9. The system of claim 8, wherein:

the gateway retains polling values from protocol devices and sends the polling values as telemetry data to the cloud;

the supervisor uses the telemetry data and displays VRF monitoring points live values; and the supervisor provides a way to command a point which in turn goes via the cloud and/or the gateway to the protocol device.

10. A system for remote monitoring, control and diagnosis of variable refrigerant flow (VRF) and/or variable refrigerant volume (VRV) via a protocol interface using a mobile app, comprising:

a gateway configured to communicate with a protocol device associated with the VRF/VRV system, the protocol device providing the protocol interface; and wherein upon addition of the protocol device under a selected gateway the mobile app automatically configures a first channel of the gateway as a protocol with default properties and lets a user configure properties of the protocol.

11. The system of claim 10, further comprising:

connecting a mobile app to a Wi-Fi access point of the gateway, mapping the gateway and getting a serial number from the gateway and associating the serial number in the mobile app; and wherein a configuration is downloaded from the mobile app to the gateway so that the gateway is aware of protocol channel details under the gateway.

12. The system of claim 11, wherein:

the details incorporate one or more items of a group comprising a device address, name and model that is configured to be set up in the mobile;

the mobile app has a template corresponding to the model using which can retrieve control and monitor parameters as protocol points in each IDU and ODU unit of a VRF;

each template is designed based on a protocol specification; and the template contains a parameter name, an address offset, and a type of protocol register.

13. The system of claim 11, wherein based on a type of protocol device, the mobile app has a template corresponding to a model to retrieve control and monitor parameters as protocol points in each IDU and ODU of a VFR.

14. The system of claim 11, wherein:

each template contains a parameter name, address offset, and type of protocol register; and the mobile app is prompted to enter a base address for each type of protocol point which comprises one of a discrete input, input register, holding register, or a coil for a given IDU or ODU.

15. The system of claim 14, wherein the mobile app automatically calculates an actual address of these points as it knows an offset for each point through templates.

16. A remote control system for a variable refrigerant flow (VRF) system comprising:

a gateway communicatively coupled to a protocol device associated with indoor and outdoor units of the VRF system;

a cloud platform comprising one or more server processors configured to communicate with the gateway over the Internet; and a mobile app configured to bind with the gateway via the cloud platform, wherein the mobile application, through the cloud platform and the gateway, enables remote monitoring and remote control of control parameters of the indoor and outdoor units of the VRF system;

wherein the mobile app establishes automatic binding/port sharing for each control parameter of each IDU and ODU to the gateway.

17. The system of claim 16, wherein:

the mobile app establishes a cloud binding for each point so that when a point is commanded/read from a cloud/remote, the gateway can identify which protocol parameter to command/read; and the mobile app provides a way to establish point sharing between systems.

18. The system of claim 17, wherein if an input point of one system has to be used to control another a second system due to a particular action, a user establishes point sharing between the input point from another controller in the same site to another system enable point from a protocol controller.

19. The system of claim 18, wherein:

the mobile app synchronizes the model data to the cloud against the site;

a supervisor application fetches the information from the cloud to enable remote monitoring and control;

the supervisor application is a web application used by building operators on a day-to-day basis;

the gateway keeps polling the values from a protocol device and sends the values as telemetry data to the cloud;

the supervisor application uses the telemetry data and displays VRF monitoring points live values; and the supervisor application provides a way to command a point which in turn goes via a cloud and gateway to a protocol device.

* * * * *